United States Patent Office 3,600,283
Patented Aug. 17, 1971

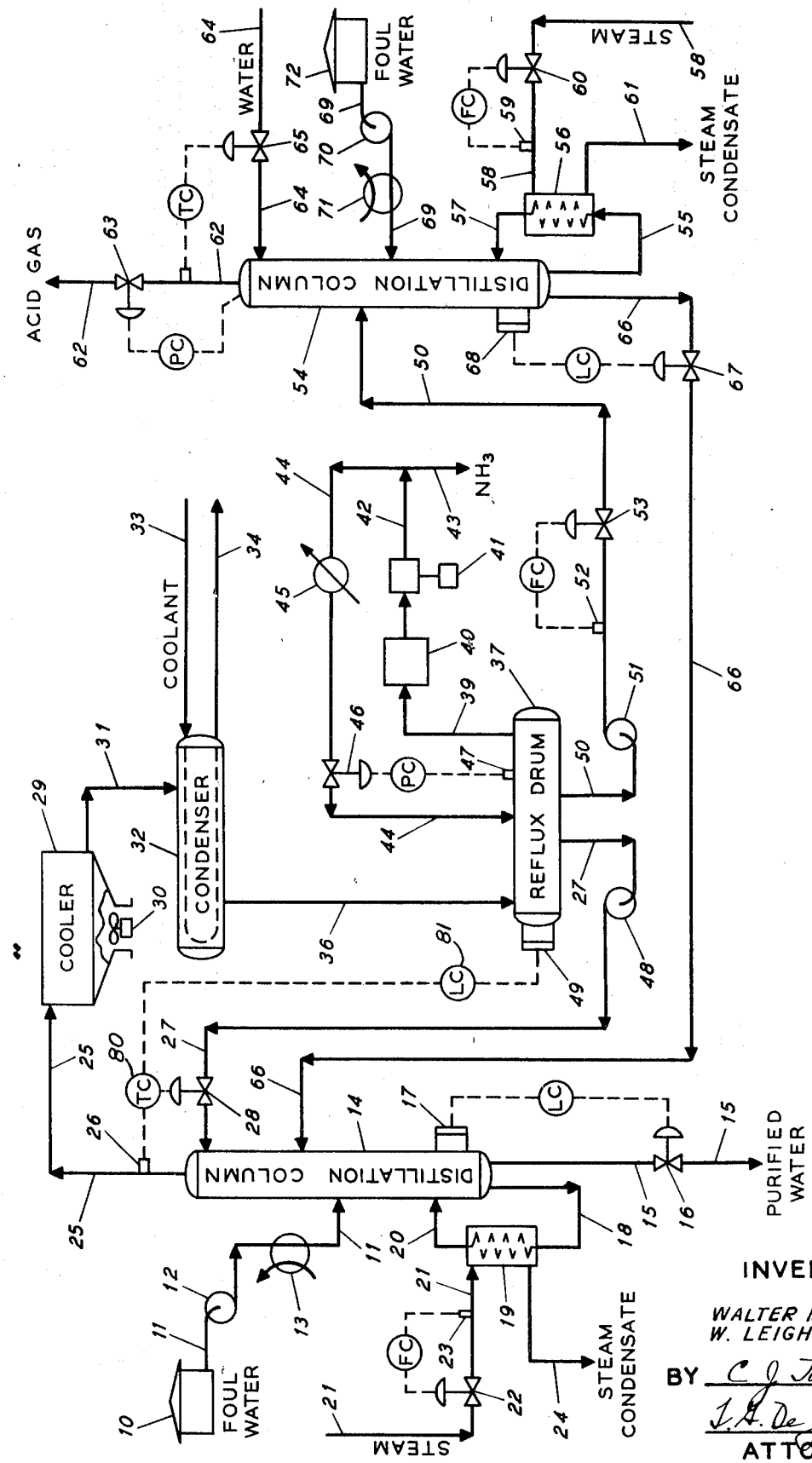

3,600,283
AMMONIA STRIPPER OVERHEAD CONTROL METHOD
Walter M. Bollen, San Rafael, Calif., and William Leigh Short, Amherst, Mass., assignors to Chevron Research Company, San Francisco, Calif.
Continuation-in-part of application Ser. No. 680,267, Nov. 2, 1967. This application May 7, 1969, Ser. No. 822,700
The portion of the term of the patent subsequent to Oct. 1, 1985, has been disclaimed
Int. Cl. B01d 3/42
U.S. Cl. 203—1                         6 Claims

ABSTRACT OF THE DISCLOSURE

Method for controlling an ammonia distillation column used to strip ammonia from an aqueous solution containing ammonia which comprises: cooling and partially condensing overhead vapors from the ammonia distillation column, receiving the partially condensed overhead from the ammonia distillation column in a reflux drum, controlling reflux to the distillation column responsive to temperature in the overhead vapor line from the ammonia distillation column, and controlling the overhead temperature responsive to the liquid level in the reflux drum.

CROSS-REFERENCE

This application is a continuation-in-part of application Ser. No. 680,267, filed Nov. 2, 1967 and now abandoned.

BACKGROUND OF THE INVENTION

Field of the invention

This invention relates to methods and means comprising distillation or fractionation for treating contaminated ammoniacal waters, more particularly for separating ammonia from aqueous ammoniacal solutions containing other contaminants including an acid gas.

Prior art

In U.S. Pat. 3,335,071 entitled "Ammonia Recovery Process," there is disclosed a process for recovering ammonia in high purity and high yield from aqueous solutions of ammonia and hydrogen sulfide. In one embodiment of the process disclosed therein, an aqueous ammonium bisulfide ($NH_4HS$) solution is first subjected to stripping at superatmospheric pressure to drive off a major portion of the hydrogen sulfide, and the stripped solution from that operation is then stripped in another column referred to as an $NH_3$ stripper to drive $H_2S$ and $NH_3$ overhead together with some water. The vapors from the $NH_3$ stripper are partially condensed, and a portion of the condensate is returned to the $NH_3$ stripper as reflux, another portion being recycled to the $H_2S$ stripper.

The $NH_3$ stripping or distillation column disclosed in the aforementioned patent which is of interest herein is operable at superatmospheric pressure and has an inlet for aqueous solution between the top and bottom thereof, a bottoms liquid outlet, reboiler means for boiling liquid at the bottom to generate up-flowing vapors in the column and overhead vapors, and a pressurizable overhead vapor handling system comprising condenser means for cooling overhead vapors to produce condensate, a reflux drum for collecting said condensate and the uncondensed vapors, means for returning condensate as reflux from said drum to said column, and means for withdrawing vapor from said drum. Also, means are provided for withdrawing a nonrefluxed portion of condensate from the reflux drum, which portion can be passed to another distillation column wherein acid gas is stripped out, and the condensate stripped of acid gas can be returned to the $NH_3$ stripping column. Thus, this portion of condensate can be considered, and is sometimes referred to herein, as recycle condensate.

In operation, $NH_3$ vapors essentially free of $H_2S$ and containing less than 1% water vapor can be obtained from the reflux drum of the $NH_3$ stripper when an appropriate superatmospheric pressure is maintained therein and in the column, if the water content of the overhead vapors from the column is regulated so that at the condensing temperature the ammoniacal condensate formed contains sufficient water to dissolve all the $H_2S$ present in a solution having a higher $NH_3$ concentration but a lower ratio of $NH_3$ to $H_2S$ than the solution fed to the column.

One of the initial methods used to control the ammonia stripper was to vary the amount of recycle condensate to the acid gas stripper in response to the level in the ammonia stripper reflux drum. This resulted in upsetting the acid gas stripper at various times, necessitating a change in the control scheme. A subsequent control scheme used was to fix the amount of recycle condensate and control the amount of reflux to the ammonia stripper responsive to liquid level in the ammonia stripper reflux drum. This control scheme was also found to be unsatisfactory as feed to the acid gas stripper was found to vary in composition too erratically, for stable control. The solution was thought to be found in refluxing all liquid condensed in excess of the amount recycled to the $H_2S$ stripper, with the overhead temperature not directly controlled and the amount of cooling in the overhead condenser being controlled responsive to the temperature of the condensate in the ammonia stripper reflux drum. This method has the serious disadvantage of periodic high temperatures for the cooling water from the overhead condenser with resultant high fouling rates in the overhead condenser.

SUMMARY OF INVENTION

According to the present invention a method is provided for controlling an ammonia distillation column used to strip ammonia from an aqueous solution containing ammonia which comprises cooling and partially condensing overhead vapors from the ammonia distillation column, receiving the partially condensed overhead from the ammonia distillation column in a vessel, controlling reflux to the distillation column responsive to temperature in an overhead vapor line from the ammonia distillation column, and controlling the overhead temperature responsive to liquid level in the vessel. Applicant's control method is a cascade system with the controlled-to overhead temperature setting being a "slave" to the level in the ammonia distillation column overhead receiving vessel. Thus, instead of stating that the overhead temperature is controlled responsive to liquid level in the overhead receiving vessel, this step of applicant's process may be stated: resetting the setting of the controlled-to overhead temperature setting responsive to liquid level in the overhead receiving vessel, to further regulate the reflux responsive to temperature in said overhead vapor line.

In one preferred embodiment of the invention the feed to the ammonia distillation column comprises an aqueous bottoms stream from an acid gas stripper, for example an $H_2S$ stripper. Feed to the acid gas stripper in this particular preferred embodiment comprises an aqueous solution of $H_2S$ and ammonia and a substantially pure $H_2S$ stream is obtained from the overhead of the $H_2S$ stripper. The aqueous bottoms solution from the $H_2S$ stripper which is fed to the ammonia distillation column, which may be referred to more simply as an ammonia stripper, is stripped of ammonia by means of the ammonia stripper and purified water is withdrawn from the bottom of the ammonia stripper. The overhead from the ammonia stripper, comprised of ammonia, water and small amounts of $H_2S$, is partially condensed and passed to a receiving vessel, typically called a reflux drum. Ammonia is withdrawn as a vapor from the reflux drum. A portion of the condensed aqueous stream is withdrawn from the reflux drum and fed to the upper part of the $NH_3$ stripper at a rate controlled in response to the overhead temperature with the overhead temperature being controlled in response to the level in the reflux drum. Another portion of the condensed aqueous stream from the reflux drum, which may be referred to as recycle condensate, is fed to the $H_2S$ stripper.

When the aqueous solution fed to the $NH_3$ stripper contains $NH_3$ and a smaller contaminating amount of an acid gas which forms a water-soluble salt with ammonia, less than about 1 mol of acid gas per 4 mols of $NH_3$, and the $NH_3$ stripper is operated at superatmospheric pressure and temperature conditions as described hereinafter, the vapor withdrawn from the reflux drum can be $NH_3$ of controlled high purity with respect to acid gas contamination. If the $NH_3$ stripper is used in combination with separate distillation means for receiving the portion of condensate withdrawn from the $NH_3$ stripper, stripping acid gas from the condensate and returning the condensate stripped of acid gas to the $NH_3$ stripper, the aqueous feed solution fed to the column can contain up to equimolar amounts of acid gas and $NH_3$, or even more acid gas than $NH_3$ in some cases. In these latter cases, however, it is necessary that the combination of the aqueous feed solution and the condensate stripped of acid gas provide a gross feed to the $NH_3$ stripper which contains 4 or more mols of $NH_3$ per mol of acid gas. Otherwise, the aqueous feed solution should be subjected to such acid gas stripping first, before passing to the $NH_3$ stripper column.

BRIEF DESCRIPTION OF THE DRAWING

The attached drawing illustrates schematically the nature and arrangement of apparatus usable in one embodiment of the invention, flow paths of process streams, and the new method of controlling operation of the unit.

DETAILED DESCRIPTION OF THE DRAWING

Referring to the drawing, from tank 10 a foul water solution containing ammonia and acid gas is passed by pump 12 through a pipe shown as line 11 into distillation column 14 at a point between the top and bottom thereof, preferably after preheating in heat exchanger 13. The column 14 may comprise any conventional apparatus for countercurrent contacting of liquid and vapor, such as multiple bubblecap distillation trays with liquid downcomers, rain decks, packing such as raschig rings, or sieve trays. From the bottom of column 14 there is provided an outlet conduit for purified water, line 15, and the rate of water withdrawal can be regulated by valve 16 to maintain a level of water in the bottom of the column, as shown by level controller "LC" linking valve 16 and level gage 17. A portion of the bottoms water is diverted via pipe 18 through tubes in reboiler 19, and the vaporized water is returned to the column via pipe 20 to provide the upflowing vapors in the column. The vapors are generated by heating, as for example by steam supplied to the jacket of reboiler 19 via pipe 21 containing control valve 22 regulating the steam flow rate in response to the measurement by orifice 23, as shown by flow controller "FC" linking orifice 23 and valve 22. Steam condensate is withdrawn from the reboiler in conduit 24.

Vapors pass up through the distillation column and overhead through vapor conduit line 25, which contains thermowell 26 with means for detecting the temperature therein. Liquid reflux is supplied to the top of the column through pipe 27 containing valve 28, the opening and closure of which is regulated responsive to temperature of the overhead vapors.

In the present invention the temperature of the overhead vapor is in turn controlled responsive to liquid level in the reflux drum 37. As the level rises the temperature is controlled to a lower temperature so as to result in less vapor, particularly water vapor, coming overhead in line 25. Conversely, as the liquid level in the reflux drum falls predetermined amount the temperature is controlled to a higher temperature by decreasing the reflux rate. This manner of control results in stable operation and relatively easy control of the ammonia stripper and the associated acid gas stripper, even for fairly wide variations in the composition of the foul water feed. Preferably the system is automated by means of a temperature controller instrument which varies the flow of reflux which in turn controls temperature of the overhead vapors in line 25, with the temperature controller in turn being automatically controlled by a level controller instrument which is actuated in response to changes of the liquid level in the reflux drum 37.

The overhead vapors in the embodiment illustrated pass to cooler 29, which may comprise multiple finned tubes through which the vapor passes for cooling provided by air blown across the tubes by fan 30. The partially cooled vapors, and any small amount of condensate which may have been formed, pass through conduit 31 to condenser 32. A coolant such as cold water or a refrigerant is supplied to the tubes in condenser 32 via pipe 33, and warm coolant is withdrawn through pipe 34 containing control valve 35. The resulting condensate formed in condenser 32, and uncondensed vapors, pass via conduit 36 to reflux drum 37 wherein they are collected.

Uncondensed vapors are withdrawn from reflux drum 37 through a conduit for vapors shown as line 39. The rate of withdrawing uncondensed vapors from the reflux drum is regulated to maintain a controlled constant pressure therein. In the embodiment illustrated this is done by providing a bypass conduit containing a control valve from the discharge side to the suction side of a compressor or blower working on the vapors. Thus, the $NH_3$ vapors in conduit 39 may be further treated to remove the last traces of acid gas and/or moisture in treating zone 40, for example comprising washing with an alkali solution or contacting with an adsorbent such as charcoal, before entering the suction of compressor 41. From the discharge of compressor 41 the net $NH_3$ product is withdrawn from the compressed vapors of conduit 42 through outlet conduit 43. When and as needed another portion of the vapors in conduit 42 are returned to the suction side of the compressor via conduit 44 containing control valve 46, and cooler 45 to remove the heat of compression. The opening and closure of valve 46 is regulated according to the pressure detected at 47 in drum 37, as shown by "PC" linking pressure pick up 47 and valve 46, to thereby maintain the reflux drum pressure constant, the valve opening if the pressure tends to fall.

A major portion of the condensate collecting in reflux drum 37 is returned by pump 48 in line 27 as reflux to distillation column 14. The flow rate of reflux condensate through line 27 is regulated by valve 28 directly responsive to the distillation overhead temperature as described above. Another portion of the condensate in reflux drum 37 is withdrawn through pipe 50 containing pump 51, orifice 52, and valve 53. The opening of valve 53 is regulated responsive to fluid flow through orifice 52, by means shown as flow controller "FC" linking valve 53 and orifice 52, so as to maintain a substantially constant flow rate of liquid through line 50. This flow controller may be set and reset as needed so as to result in withdrawal of liquid in line 50 at a fixed rate proportional to the feed rate of aqueous ammonia solution to the ammonia distillation column.

In the operation of the apparatus as just described, the aqueous feed solution or foul water may be supplied to column 14 through line 11 at the rate at which it becomes available. If, however, this is subject to wide variations, surge capacity may be provided in the nature of feed tank 10. Heat is preferably supplied to boil the solution and provide upflowing and overhead vapors at a substantially constant rate.

The portion of condensate withdrawn from the reflux drum 37 through line 50 is passed to separate distillation means comprising column 54. Column 54, like column 14, comprises conventional distillation apparatus for countercurrent contacting of vapor and liquid. Upflowing vapors are generated by withdrawing a portion of liquid from the bottom through line 55, boiling it in reboiler 56 and returning the vapors through line 57. Heat is supplied by steam to reboiler 56 introduced through line 58 containing control valve 60 operated to maintain a fixed flow rate through orifice 59, as shown by flow controller "FC" linking orifice 59 and valve 60. Steam condensate is withdrawn through line 61. Overhead vapors are withdrawn from the column through line 62 containing valve 63, the opening and closing of which is regulated to maintain a substantially constant superatmospheric pressure in the column, as shown by pressure controller "PC." Water must be introduced into distillation column 54 if the overhead vapors are to be acid gas free of ammonia. Desirably the water is added cold at the top of the column as shown by line 64 containing valve 65. The water rate may be regulated to maintain a constant overhead temperature, as shown by temperature controller "TC" operating valve 65. With a high temperature at the bottom of column 54 and a low temperature at the top of the column, the acid gases will be vaporized and carried overhead while ammonia will be washed out of the upflowing vapors and carried out the bottom of column 54. In some cases fresh water may be supplied via line 64, but it is also possible to recycle a portion of the purified water in line 16 from the bottom of column 14 to column 54. Also, additional cooling means may be provided in the upper portion of column 54, which additional cooling may be regulated as the means of controlling overhead temperature. By operating column 54 at a superatmospheric pressure of 20–400 p.s.i.g., preferably 100–300 p.s.i.g., a high molar ratio of ammonia to acid gas of above 4:1 can be obtained in the solution at the column bottom. Thus, from the bottom of column 54 there is withdrawn an aqueous ammoniacal solution in line 66 containing valve 67, the opening and closure of which is regulated to maintain a level of liquid in the column as indicated by "LC" linking valve 67 and level gage 68. The material in line 66 comprises the withdrawn portion of condensate stripped of acid gas, plus additional water. This stripped condensate is returned to column 14 via line 66.

If the foul water aqueous feed solution in line 11 contains substantially more ammonia than acid gas, at least about 4 mols of ammonia per mol of acid gas, column 14 can be operated to produce essentially pure ammonia vapors in line 43 without the use of column 54. Thus, the ammonia concentration in the overhead system can be built up by imposing a high pressure set point so that control valve 46 remains open until the concentration of ammonia in reflux drum 37 has built up sufficiently at the controlled low temperature such that the vapor therein is essentially ammonia. If the aqueous feed solution contains only slightly more ammonia than acid gas, the pressure in the reflux drum will not build up sufficiently to close valve 46. If the pressure at which valve 46 closes is lowered, it will be found that the ammonia vapors are contaminated with substantial amounts of acid gas. By withdrawing a portion of the condensate from drum 37, diluting it with water and stripping off acid gas in separate distillation equipment, and returning the stripped condensate to the column, the concentration of ammonia in the overhead system can be built up to the point where the vapors of line 43 are essentially pure $NH_3$, if the overhead vapor temperature and condensing temperature are properly controlled.

The embodiment of the invention wherein two columns are used and the foul water feed solution is first treated in an $NH_3$ stripper, is particularly useful in treating dilute aqueous solutions containing less than about 2 mol percent $NH_3$, and especially solutions containing less than 1 mol percent $NH_3$, regardless of whether the solution contains substantially more $NH_3$ than acid gas or only about the same amount or less ammonia as compared to acid gas. This is because column 54, which would operate only on the portion of reflux condensate withdrawn through line 50 and the diluting water added through line 64, can be made substantially smaller than it would have to be if it were used to treat the entire aqueous feed stream to first strip off acid gas to obtain a high ratio of ammonia to acid gas in the feed to column 14. The return of stripped condensate from column 54 to column 14 via line 66 provides the desirable high ratio of ammonia to acid gas in the upper portion of column 14 without the entire feed having to be first stripped of acid gas. The gross feed to column 14, comprising feed and stripped condensate from column 54, must however contain more $NH_3$ than acid gas in a mol ratio of 4 to 1 or higher.

If the foul water to be treated for recovery of ammonia contains above about 2 weight percent $NH_3$ and only one or two mols of $NH_3$ per mol of acid gas, acid gas is preferably first stripped from the water to provide a higher ratio of $NH_3$ to acid gas in the solution fed to the $NH_3$ stripper. For example, in the drawing, such a foul water stream in tank 72 is passed by pump 70 through pipe 69 and preheater 71 into column 54 between the top and bottom thereof. Thus there are the possibilities of passing net foul water feed to column 54 only from tank 72 or to column 14 only from tank 10; of passing a foul water feed of one composition to column 14 while simultaneously passing another foul water feed of different composition to column 54; and of splitting a single feed into two separate portions and passing one portion to column 14 and the other portion to column 54.

The apparatus and method of the present invention has been tried out in a large scale unit and found to be superior in providing stable, trouble-free performance, uniform product quality, and requiring very little operator attention as compared to the previous apparatus and methods wherein, for example, the cooling in condenser 32 is controlled in response to temperature in the reflux drum or, for example, the control method wherein the amount of recycle condensate to the acid gas stripper was varied in response to the level in the ammonia stripper reflux drum. Even though in the previous operation of varying recycle condensate, the flow of excess condensate to the $H_2S$ stripper was small compared to the total feed to that column (the aqueous feed solution also being fed to the $H_2S$ stripper), and variations in flow rate were not large, apparently the condensate was sufficiently concentrated in $NH_3$ and $H_2S$ that even small changes in flow rate could not be tolerated. From time to time, for unexplained reasons, upset conditions arose when the $H_2S$ stripper pressure cycled wildly, and control of the $NH_3$ stripping and recovery column was lost resulting in the production of off-test $NH_3$. These problems were eliminated by the new control scheme for the $NH_3$ stripper.

The apparatus of the present invention rapidly pays for the cost of installing and operating it when used to recover salable $NH_3$ and $H_2S$ from foul refinery water obtained by water scrubbing hydrocarbon conversion reaction effluent streams containing substantial amounts of these byproducts, if present in the water in reasonable concentrations of about 1 mol percent and above. For treating more dilute streams, the invention makes possible defraying at least part of the cost by producing salable products while producing clean, nonpolluting water without discharging noxious gases into the atmosphere as occurs in previously-used foul water stripping operations yielding mixtures of $NH_3$ and $H_2S$ which are then incinerated. The following presents a material balance and corresponding typical operating conditions for an embodiment as illustrated in the drawing, for a case where the aqueous feed is quite dilute such that feeding it directly to the $NH_3$ stripper becomes advantageous.

| Stream | Line No. | Composition, wt. percent | | | Flow rate, lbs./time | Conditions | |
|---|---|---|---|---|---|---|---|
| | | $H_2O$ | $NH_3$ | $H_2S$ | | Temp., °F. | Pressure, p.s.i.g. |
| Feed | 11 | 98.5 | 0.5 | 1.0 | 1,000 | | |
| Water product | 15 | 100 | <300 [1] | <100 [1] | 1,475 | 307 | 50 |
| Overhead vapors | 25 | 33 | 51 | 16 | 375 | 240 | 50 |
| $NH_3$ vapors | 43 | 0.2 | 99.7 | 0.1 | 4.9 | 95 | 50 |
| Condensate, reflux | 27 | 33.3 | 50 | 16.7 | 250 | 100 | 50 |
| Condensate, withdrawn | 50 | 33.3 | 50 | 16.7 | 120 | 100 | 50 |
| $H_2S$ vapors | 62 | 0.1 | 100 [1] | 99.9 | 9.9 | 100 | 180 |
| Water added | 64 | 100 | | | 490 | 90 | 180 |
| Recycle bottoms | 66 | 88.3 | 10 | 1.7 | 600 | 320 | 180 |

[1] P.p.m.

Essentially pure $H_2S$ can also be obtained overhead from the acid gas stripping column at 180 p.s.i.g. if only sufficient water is added into the column so that the bottoms water returned to the $NH_3$ stripping and recovery column contains about 20 weight percent $NH_3$.

The same apparatus, though with somewhat modified operating conditions, will also be found useful in treating a variety of other foul water streams produced in a variety of industrial technologies. As examples, there may be mentioned waste ammoniacal liquors produced in the coal industry as an adjunct to coking operations, Bate liquors and lime liquors produced in the leather treating industries, waters containing decomposition products of anaerobic treatment of sewage and industrial wastes, and various waste streams produced in such industries as textiles and paper, iron and steel, rubber, sulfur mining, and in purifying hydrogen produced by partial oxidation of hydrocarbon oils. Typical contaminants which may be present in such streams in addition to ammonia include $H_2S$, $CO_2$, HCN, thiosulfates, thiocyanates, phenols, calcium salts, protein matter, sodium sulfide, and hydrocarbons to name but a few. The presence of such contaminants alters the vapor pressure of ammonia over the aqueous solutions in a manner which can become too complex for advance determination, particularly if there are several contaminants present. The control method and means used in the present invention makes possible determining the deviations from ideal behavior caused by such contaminants, during operation of the unit, whereby suitable operating conditions can be arrived at by incremental adjustment of the temperatures and pressure.

Based on data for treating aqueous solutions of $NH_3$ and $H_2S$, the following are ranges of operating conditions which will be found usable in treating similar solutions containing $CO_2$ and/or other contaminants, including preferred ranges at which desirable combinations of low investment and operating cost with high purity product $NH_3$ are to be expected.

| | $NH_3$ recovery column | | Acid gas stripping column | |
|---|---|---|---|---|
| | Broad range | Preferred | Broad range | Preferred |
| Pressure, p.s.i.g. | 0-150 | 50-80 | 0-350 | 100-180 |
| Overhead vapor temp., °F. | 180-320 | 240-260 | 50-120 | 80-100 |
| Condensing temp., °F. | 60-175 | 90-150 | | |
| Bottoms temp., °F. | 212-370 | 300-320 | 200-400 | 300-340 |

In many cases it will be desirable to make material balance determinations for control purposes, so that flow indicators and sampling points will be provided in the various streams of the unit. In this respect, it will be noted that the drawing is schematic only.

Although various specific embodiments of the invention have been described and shown, it is to be understood they are meant to be illustrative only and not limiting. Certain features may be changed without departing from the spirit or essence of the invention. It is apparent that the invention has broad application to methods for preparation of foul water streams. Accordingly, the invention is not to be construed as limited to the specific embodiments illustrated but only as defined in the following claims.

What is claimed is:

1. Method for controlling an ammonia distillation column used to strip ammonia from an aqueous solution containing ammonia which comprises, in combination:
   (a) distilling $NH_3$ vapors upward in said distillation column,
   (b) cooling and partially condensing overhead vapors from the ammonia distillation column,
   (c) receiving the partially condensed overhead from the ammonia distillation column in a vessel,
   (d) refluxing condensate to the ammonia distillation column,
   (e) sensing the temperature of the overhead vapor,
   (f) controlling the rate of flow of reflux to the distillation column directly responsive to said sensed temperature in the overhead vapor line from the ammonia distillation column thereby establishing an overhead vapor temperature setting,
   (g) sensing the liquid level in the overhead receiving vessel, and
   (h) resetting the overhead vapor temperature setting responsive to the liquid level sensed in the overhead receiving vessel to further regulate the reflux responsive to the overhead vapor temperature.

2. Method as in claim 1 wherein nonreflux liquid condensate is withdrawn from the vessel at a fixed rate proportional to the feed rate of aqueous ammonia solution to the ammonia distillation column.

3. Method as in claim 2 wherein said nonreflux liquid contains small amounts of acid gas and said nonreflux liquid is passed to an acid gas stripper for removal of at least a portion of the acid gas from the nonreflux liquid.

4. Method as in claim 3 wherein the aqueous ammonia solution fed to the ammonia distillation column is an aqueous bottoms stream from an acid stripper and the nonreflux liquid is recycled to said acid gas stripper.

5. Method as in claim 4 wherein the acid gas is $H_2S$.

6. A method according to claim 1 wherein the reflux is increased in response to an increase in overhead temperature, decreased in response to a decrease in overhead temperature, and wherein the overhead temperature is controlled to a higher temperature when liquid level falls in said vessel, and controlled to a lower temperature when liquid level rises in said vessel.

References Cited

UNITED STATES PATENTS

| | | | |
|---|---|---|---|
| 3,304,727 | 2/1967 | Roskamp et al. | 62—21 |
| 3,342,700 | 9/1967 | Rynsdorp | 203—1 |
| 3,342,702 | 9/1967 | Rynsdorp | 203—1 |
| 3,398,087 | 8/1968 | Lieber et al. | 203—1 |
| 3,404,072 | 10/1968 | Bollen et al. | 203—1 |
| 3,428,527 | 2/1969 | Rynsdorp et al. | 203—1 |

WILBUR L. BASCOMB, Jr., Primary Examiner

U.S. Cl. X.R.

23—193; 203—2, 75; 202—160, 181